(12) United States Patent
Reksten et al.

(10) Patent No.: US 6,396,909 B1
(45) Date of Patent: May 28, 2002

(54) INTER-SYSTEM CALL TRANSFER

(75) Inventors: Harald Samuel Reksten, Hockessin, DE (US); Jonathan Paul Davis, Downingtown; Kathleen Georgia Elliot, Chester Springs, both of PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/307,014

(22) Filed: May 7, 1999

(51) Int. Cl.[7] .................... H04M 1/64; H04M 7/00; H04M 3/42

(52) U.S. Cl. ................ 379/88.18; 379/221.01; 379/212.01

(58) Field of Search ................ 379/265, 266, 379/309, 88.18

(56) References Cited

U.S. PATENT DOCUMENTS

| | | | |
|---|---|---|---|
| 4,688,212 A | 8/1987 | MacGinitie et al. | 370/85 |
| 5,029,199 A | 7/1991 | Jones et al. | 379/89 |
| 5,163,081 A * | 11/1992 | Wycherley et al. | 379/52 |
| 5,394,460 A | 2/1995 | Olson et al. | 379/67 |
| 5,544,163 A * | 8/1996 | Madonna | 370/352 |
| 5,557,668 A | 9/1996 | Brady | 379/212 |
| 5,633,924 A * | 5/1997 | Kaish et al. | 379/266 |
| 5,659,599 A | 8/1997 | Arumainayagam et al. | 379/89 |
| 5,724,347 A | 3/1998 | Bell et al. | 370/377 |
| 5,724,418 A | 3/1998 | Brady | 379/212 |
| 5,740,231 A | 4/1998 | Cohn et al. | 379/89 |
| 5,923,643 A * | 7/1999 | Higgins et al. | 370/218 |
| 5,937,057 A * | 8/1999 | Bell et al. | 379/265.02 |
| RE36,416 E * | 11/1999 | Szlam et al. | 379/88.09 |
| 6,173,052 B1 * | 1/2001 | Brady | 379/265.01 |
| 6,246,759 B1 * | 6/2001 | Greene et al. | 379/265 |

* cited by examiner

*Primary Examiner*—Creighton Smith
*Assistant Examiner*—Hector Agdeppa
(74) *Attorney, Agent, or Firm*—Woodcock Washburn LLP; Mark T. Starr; Lise A. Rode

(57) ABSTRACT

A "high availability" telephony/messaging system includes a first host comprising a first telephony application, a second host comprising a second telephony application, and a TSP for routing calls on a plurality of telephone circuits to the first and second hosts, for processing by one of the first and second applications. An Inter-System Call Transfer process permits a call routed to an application on one host to be transferred to an application on another host. Therefore, a call routed to a host that is unable to process the call can be redirected to another host that is able to process the call.

19 Claims, 4 Drawing Sheets

TSP --------------> Initiate ---------------->VNMSn-------Incoming Call------------>Appl (host n)

TSP<---------------Allow Group<------------VNMSn<------Connect Call -------------Appl (host n)

TSP<---------------Answer<----------------VNMSn

TSP --------------->Answer---------------->VNMSn------Call Connected---------->Appl (host n)

TSP<---------------Send Group------------VNMSn<------Extended Send Voice----Appl (host n)

TSP---------------DTMF---------------->VNMSn

TSP---------------DTMF---------------->VNMSn

TSP---------------Group Result----------->VNMSn-------Message Sent--------->Appl (host n)

TSP <---------------Purge DTMF (Count)-----VNMSn<------Transfer Dialog---------Appl (host n)

TSP <--------------Transfer Port-----------VNMSn

TSP -------------- Transfer Port----------->VNMS (host n+1)

TSP <----------- Retrieve DTMF-----------VNMS (host n+1)

VNMSn+1------Incoming Call------->Appl (host n+1)

TSP---------------DTMF---------------->VNMSn+1

TSP<---------------Send Group-------------VNMSn+1<-----Extended Send Voice -------- Appl (host n + 1)

TSP---------------Group Result------------>VNMSn+1--------Message Sent------>Appl (host n + 1)

TSP<---------------Terminate Group---------VNMSn+1<------Terminate Call------Appl (host n + 1)

TSP--------------Unconditional Terminate------>VNMSn+1

TSP<---------------Signaling Terminate------VNMSn+1

FIGURE 4A

TSP --------------> Initiate ---------------->VNMSn

TSP<---------------Transfer Port<------------VNMSn

TSP -------------- Transfer Port------------>VNMS (host n+1)----Incoming Call ---->Appl (host n+1)

FIGURE 4B

INTER-SYSTEM CALL TRANSFER

FIELD OF THE INVENTION

The present invention relates generally to voice messaging systems, and more particularly to a multiple node messaging system wherein each Network Interface Unit or Telephony Services Platform (which is a form of Network Interface Unit) is shared by two or more host computers.

BACKGROUND OF THE INVENTION

Messaging systems that provide voice, fax and/or e-mail messaging capabilities are well known. FIG. 1 illustrates an exemplary prior art messaging system developed by Unisys Corporation, Blue Bell, Pa., the assignee of the present invention. The system of FIG. 1 comprises multiple servers (which may be implemented, e.g., with A-series or Clearpath™ computers offered by Unisys Corporation) each supporting a network applications platform (NAP), which provides an underlying platform for storage and retrieval of messages, and a messaging application running on the platform. A voice mail application, such as the Unisys Universal Voice Messaging System (UVMS), is an example of a messaging application that runs on the messaging platform. The UVMS application determines how calls to the messaging system are handled, what prompts are played to callers, and which features are available. Such applications typically maintain a database of subscribers who have "mailboxes" on the system. The messaging platform interfaces to a telephone network through a Network Interface Unit (NIU). Received messages are stored by the messaging platform in a local message store, or voice file.

The network applications platform, or NAP, may be located at a local telephone company connected to one or more central offices or switches, or could alternatively be located on the premises of a customer, such as a large or medium-sized company. In the latter case, the NAP would typically be connected to a private branch exchange (PBX) instead of directly to a PSTN. Telephone customers typically demand high (close to 100%) system availability, which means that, for a large customer having hundreds or even thousands of employees at a given location, it is extremely difficult to take the telephony application off-line for even a short time to make updates or modifications. Therefore, when it becomes necessary to modify the application in any way, the application provider needs a way to make such modifications in a way that maintains system availability. This need is particularly severe for high volume telephony systems, which typically cannot be taken out of service without inconveniencing significant numbers of users.

Network Interface Units are available from a number of different vendors. For example, NIUs suitable for use with the present invention include: (a) the Telephony Services Platform available from Unisys Corporation, Blue Bell, Pa.; (b) the Summa Four VCO 80 available from Summa Four, Inc., Manchester, N.H.; and (c) the Voice Frame 2020 available from Harris Corporation, Melbourne, Fla. The Telephony Services Platform (TSP) is most preferred. The difference between it and the other products just mentioned is that the TSP includes a board that plays back digitized voice from a voice file whereas the other products require a separate playback module.

In use, if a subscriber is not available when an incoming call is received, the Public Switched Telephone Network (PSTN) forwards the call to the messaging system, which typically allows the caller to record a message, and then will store the message for later retrieval by the subscriber. A key (or token) returned to the messaging application uniquely identifies the stored message data within the message store. This key can be used at a later time to retrieve the message from the message store for playback to the subscriber.

In the exemplary system shown in FIG. 1, a first node of the system comprises a server/NAP 10a, voice file and database 12a and NIU 14a. Similarly, a second node comprises a server/NAP 10b, voice file and database 12b and NIU 14b; and a third node comprises a server/NAP 10c, voice file and database 12c and NIU 14c. The first node, e.g., could be responsible for a predefined geographic area encompassing hundreds of thousands of subscribers, or simply for a predefined set of telephone lines or circuits. The respective nodes are separately coupled to a public switched telephone network, or PSTN, 16, and are thereby made accessible to their subscribers. Moreover, subscribers of one node can employ messaging to transfer copies of messages (such as voice messages) to subscribers of another node. The respective nodes may or may not share access to each other's voice files (see copending application Ser. No. 09/161,214, filed Sep. 25, 1998, "Multiple Node Messaging System Wherein Nodes Have Shared Access To Message Stores Of Other Nodes").

An important characteristic of a messaging system is that it be highly reliable and able to quickly recover from system failures. This characteristic is generally referred to as system "availability." The present invention relates to a messaging system architecture that comprises multiple redundant messaging nodes in order to achieve high availability. The present invention was developed in the process of designing a messaging system that would continue to provide access to user services even while one host computer (or disk) is inoperative or otherwise unable to process a call. A goal of the present invention is to implement the "shared TSP" concept described below such that each TSP has the ability to route a call to any one of a number of hosts. More particularly, the present invention was designed to permit a call routed to an application on one host to be transferred to an application on a different host.

Further background information concerning the construction and operation of messaging systems, and particularly systems employing a Network Applications Platform (NAP) for interfacing a telephone network and network applications running on an enterprise server, may be found in the following patents and copending patent applications, which are hereby incorporated by reference:

U.S. Pat. No. 5,133,004, Jul. 21, 1992, "Digital Computer Platform for Supporting Telephone Network Applications";

U.S. Pat. No. 5,138,710, Aug. 11, 1992, "Apparatus and Method for Providing Recoverability in Mass Storage Data Base Systems Without Audit Trail Mechanisms";

U.S. Pat. No. 5,384,829, Jan. 24, 1995, "Digital Computer Platform for Supporting Telephone Network Applications";

U.S. Pat. No. 5,323,450, Jun. 21, 1994, "Telephone Network Applications Platform for Supporting Facsimile Applications";

U.S. Pat. No. 5,494,606, Feb. 20, 1996, "Multi-Lingual Prompt Management System for a Network Applications Platform";

U.S. Pat. No. 5,633,916, May 27, 1997, "Universal Messaging Service Using Single Voice Grade Telephone Line Within a Client/Server Architecture";

U.S. patent application Ser. No. 08/944,924, filed Oct. 6, 1997, "Enhanced Multi-Lingual Prompt Management in a Voice Messaging System With Support for Speech Recognition" (attorney docket TN078);

U.S. patent application Ser. No. 08/964,744, filed Nov. 5, 1997, "Methods and Apparatus for Providing External Access to Executable Call Flows of a Network Application" (attorney docket TN079);

U.S. patent application Ser. No. 08/987,571, filed Dec. 11, 1997, "Multiple Language Electronic Mail Notification of Received Voice and/or Fax Messages" (attorney docket TN091);

U.S. patent application Ser. No. 09/094,126, filed Jun. 9, 1998, titled "Universal Messaging System Providing Integrated Voice, Data and Fax Messaging Services to PC/Web-based Clients, Including a Session Manager for Maintaining a Session Between a Messaging Platform and the Web-based Clients" (attorney docket TN094);

U.S. patent application Ser. No. 09/093,593, filed Jun. 9, 1998, titled "Universal Messaging System Providing Integrated Voice, Data and Fax Messaging Services to PC/Web-based Clients, Including a Content Manager for Receiving Information from Content Providers and Formatting the Same into Multimedia Containers for Distribution to Web-based Clients" (attorney docket TN095);

U.S. patent application Ser. No. 09/094,266, filed Jun. 9, 1998, titled "Universal Messaging System Providing Integrated Voice, Data and Fax Messaging Services to PC/Web-based Clients, Including a Large Object Server for Efficiently Distributing Voice/Fax Messages to Web-based Clients" (attorney docket TN096);

U.S. patent application Ser. No. 09/094,026, filed Jun. 9, 1998, "System and Method for Integrating Notification Functions of Two Messaging Systems in a Universal Messaging Solution" (attorney docket TNN103); and U.S. patent application Ser. No. 09/161,214, filed Sep. 25, 1998, "Multiple Node Messaging System Wherein Nodes Have Shared Access To Message Stores Of Other Nodes" (attorney docket TN102).

SUMMARY OF THE INVENTION

As discussed above, the present invention may be utilized to provide a "high availability" messaging system comprising network interface devices (NIDs), such as TSPs or NIUs (the terms TSP and NIU are considered synonymous in the context of the present invention), that are shared by a number of host computers. The present invention is not limited to the specific interface device architectures disclosed herein, and so the term "network interface device" is intended to encompass NIUs in general as well as the TSP employed in the preferred embodiments. The "Inter-System Call Transfer" feature of the present invention permits a call routed to an application on one host to be transferred to an application on another host.

A telephony system in accordance with the present invention comprises a first host comprising a first telephony application, a second host comprising a second telephony application, and a network interface device (e.g., TSP or NIU) for routing calls on a plurality of telephone circuits to the first and second hosts, for processing by one of the first and second applications. (Typically, more than two hosts will be included in the system.) The network interface device includes the capability to transfer a call from one host to another host. Therefore, a call routed to a host that is unable to process the call can be redirected to another host that is able to process the call.

With respect to the present invention, the NID is a device that logically maps a plurality of telephone circuits to a plurality of host computers for processing by applications running on the host computers. In the presently preferred implementation of the invention, the NID is a TSP that comprises a plurality of Primary Rate Interface Modules (PRIMs), each of which includes a plurality of channels for receiving incoming calls. The inventive system is programmed to perform an Inter-System Call Transfer process. The basic Inter-System Call Transfer process comprises receiving a new incoming call via a selected one of the TSPs; assigning a TSP identifier to the incoming call; transferring the incoming call from the selected TSP to a bus; receiving the call in the first host; creating a call record in the first host; providing the call to the first application running on the first host; determining whether the first host can process the call; if the first host can process the call, passing the call to a first application running on the first host; and, if the first host cannot process the call, issuing a request to the selected TSP to transfer the call to the second host. In the preferred implementation, the TSPs each include a number of PRIMs, and each PRIM includes a plurality of channels for receiving incoming calls. The incoming call, therefore, may be assigned, in addition to a TSP identifier, a PRIM identifier and a channel identifier, for inclusion in the call record.

In the presently preferred implementation, a Transfer Port message containing information about the state of the call is created when a decision is made to transfer a call. The Transfer Port message preferably includes a call record containing information regarding the current host and application state, and information identifying the host to which the call is to be transferred. The Transfer Port message is transmitted from the first host to the TSP, and the TSP receives the message and routes it to the second host. The second host uses the call record information to recreate the state of the call on the second host, and then informs a second application running on the second host that the call is there.

The incoming call will typically include DTMF signals, which are received by the selected TSP, buffered in a local DTMF buffer, and then passed by the TSP to the first host. The DTMF signals are temporarily buffered by an Application Interface Module (AIM) in the first host, and then passed to the first application for processing. The AIM keeps a count of the number of DTMF digits that the first application has processed, as well as a timestamp for each signal. When a call transfer request is made by the first host, a purge DTMF operation is performed, whereby the selected TSP is caused to stop passing DTMF signals to the AIM and instead to buffer incoming DTMF signals in the local TSP buffer, thus allowing the selected TSP to determine which DTMF signals in its buffer have and have not already been processed by the first application. Any DTMF signals that have not yet been processed at the time the call is transferred are replayed to the second application on the second host, thereby preventing DTMF signals from being lost during the call transfer process.

Other features and aspects of the present invention are described below.

BRIEF DESCRIPTION OF THE DRAWINGS

The foregoing summary and the following detailed description of presently preferred embodiments are better understood when read in conjunction with the appended drawings, in which:

FIGS. 4A and 4B depict signal flows for the Inter-System Call Transfer processes of the present invention.

DETAILED DESCRIPTION OF PREFERRED EMBODIMENTS

Overview

An exemplary embodiment of the present invention provides a NAP-based messaging system with improved availability. This improved availability accounts for outages due to all types of failures and also includes software/hardware upgrades. The shared TSP and Inter-System Call Transfer features of the present invention represent an important step toward the goal of improved availability.

The present invention permits multiple hosts to share a set of TSPs so that, when one host fails, the workload will automatically be routed to another host or hosts. It also provides a mechanism whereby multiple hosts can work together. Prior systems have allowed the operator of the messaging system to distribute workload amongst multiple hosts, but with the Inter-System Call Transfer feature of the present invention each host can communicate with every other host in order to designate the correct host to process a call.

Figure 1:
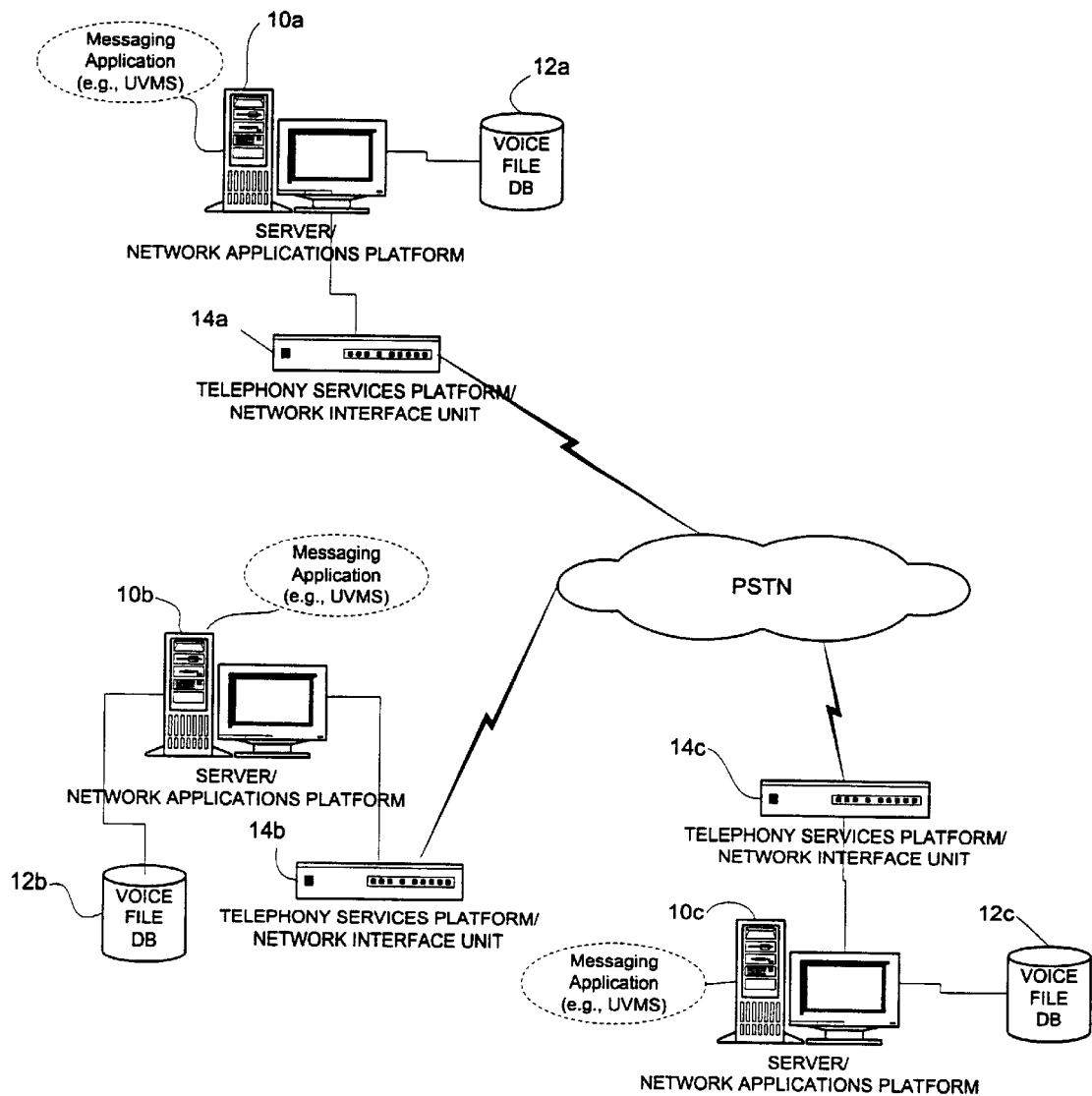
FIG. 1 schematically depicts a messaging system in which each TSP or NIU is connected to only one host.
Figure 2:
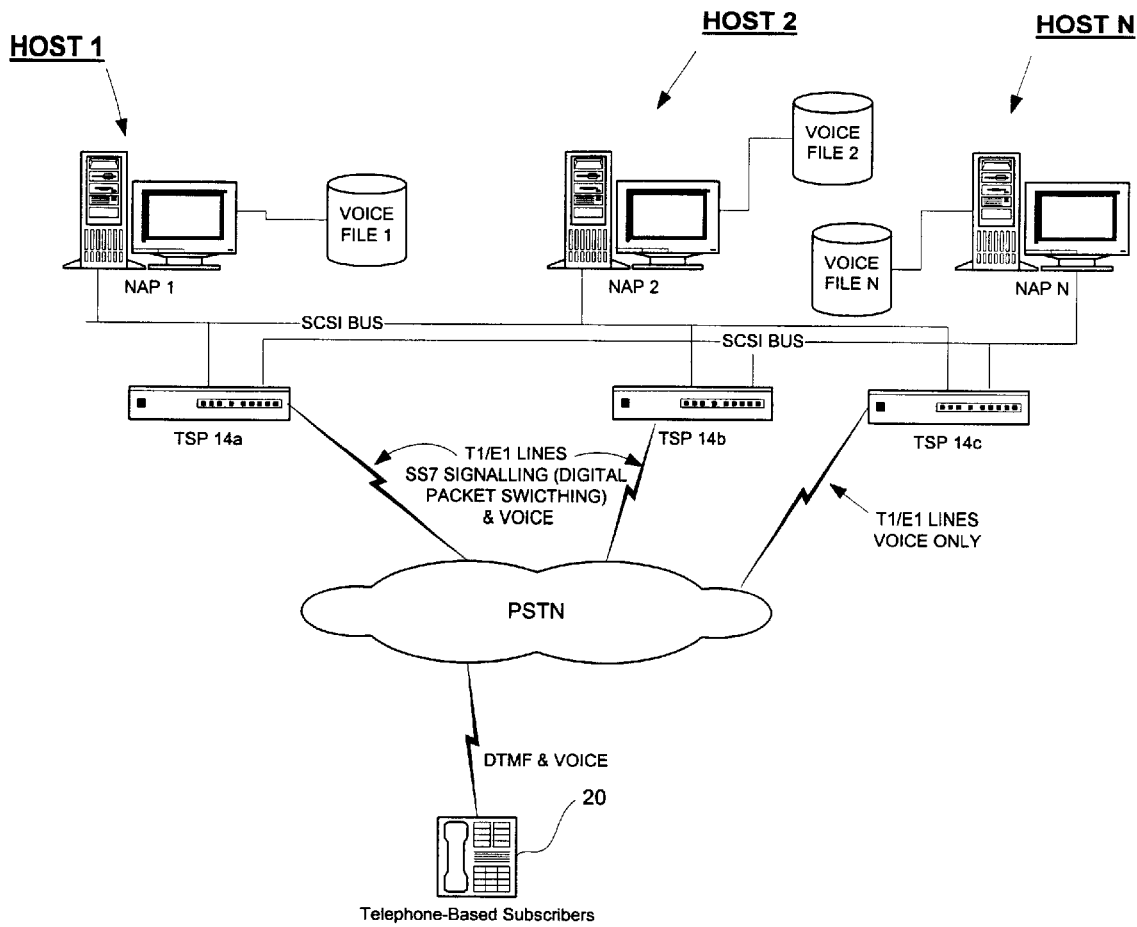
FIG. 2 schematically depicts a presently preferred shared TSP implementation of a messaging system in accordance with the present invention.

One presently preferred embodiment of the inventive system is shown in FIG. 2. As shown, one or more telephone-based subscribers 20 have access via a PSTN to a set of TSPs 14. In this example, the PSTN communicates with the TSPs over T1/E1 lines using SS7 signaling (Signaling System 7 is an industry standard employing digital packet switching) and digital or analog voice signals. The TSPs are each coupled via a bus (in this case a Small Computer System Interface, or SCSI, bus) to a NAP-based host computer. For example, TSP 14a is coupled to Host 1, Host 2 and Host N; TSP 14b is similarly coupled to Host 1, Host 2 and Host N; and TSP 14c is coupled to Host N. (The intent of the terminology "Host 1," "Host 2" and "Host N" is to show that a call can be transferred from a specific host to one of N hosts, where N is an integer greater than 1.) The number of hosts that can share a cluster of TSPs is limited by the particular hardware employed to implement the invention. In one exemplary embodiment, described in greater detail below, the actual number of hosts is 255. The limits imposed on the number of hosts are physical limits and are based, in this example, on SCSI connectivity, such as the number of initiators and targets that can share a SCSI bus and the number of SCSI connections to a TSP.

The Inter-System Call Transfer feature of the present invention is described below in greater detail with reference to the presently preferred embodiment depicted in FIG. 3. First, however, since the Network Applications Platform, or NAP, is a central part of the presently preferred implementation of the Inter-System Call Transfer process, we will provide a brief summary description of the NAP.

The Network applications Platform

U.S. Pat. No. 5,133,004, Jul. 21, 1992, titled "Digital Computer Platform for Supporting Telephone Network Applications," discloses a Network applications Platform that may be used in implementing the present invention. The disclosure of this patent represents part of the background of the present invention, and thus is summarized below. The reader may review the patent itself for a complete description of the NAP. In addition, U.S. Pat. No. 5,323,450, dated Jun. 21, 1994, may be reviewed for background.

The variety of telephone services currently available include call answer, call forward, voice store and forward, voice-mail, emergency number facilities, directory assistance, operator assistance, call screening, and automatic wake-up services. Such services had generally been provided by dedicated systems specifically designed for the service and the hardware environment in which the system was to be deployed, which made the systems inflexible and expensive. Following divestiture, the Bell Operating Companies (BOCs) and Independent Telephone Companies (Telcos), in devising ways to increase the return on their installed telephone networks, began to offer new services that integrated into, or interfaced with, the existing network, resulting in greater utilization of the network. The invention disclosed in U.S. Pat. No. 5,133,004 made it easier for the BOCs and Telcos to provide new services by removing the dependence on the telephone switch provider in implementing these new services. In particular, the Network Applications Platform, or NAP, was designed to interface with the telephone network and support application software deployed by the BOCs and Telcos to provide services they wanted to offer.

The NAP is a digital computer platform that interfaces with the network and is programmed with software providing the telephone network functionality required to support the new service-related applications. Such functionality includes detecting and reporting an incoming call from the network, initiating an outgoing call to the network, receiving a voice message from the network, sending a voice message to the network, collecting digits entered from the network, switching calls between channels, terminating calls, and detecting and reporting call termination.

The NAP includes a database including a voice file for storing predetermined digitized voice and tone messages to be applied to the network and voice messages received from the network to be re-applied thereto. The NAP may be implemented, for example, on an enterprise or mainframe computer (e.g., an A Series or Clearpath computer system commercially available from Unisys Corporation). The NAP may be implemented so as to use the standard parallel I/O processing capabilities, the Data Management System II (DMSII) and disk storage facilities and Direct I/O, as well as the communications capabilities such as Communication Management System (COMS) and Data Communications (DATACOM) of the A Series system. The applications communicate with the NAP through message-passing communication apparatus, such as the A Series COMS. The applications comprise a plurality of independent applications deployed by the telephone company to provide the desired services to the users.

The NAP includes three software modules collectively referred to as a Voice Network Management System (VNMS). The VNMS comprises an Application Interface Module (AIM), a Voice Message Management Module (VMMM), and a Network Interface Unit Manager (NIUM). (The NIUM includes the TSP Interp, CP Module, Call Record Manager (CRM) module, TSM module and Router module. The Router module handles communication from the TSM to the TSP Interp module. These components are described in greater detail below.) The VNMS resides in main memory of the computer system on which the NAP is installed. The applications communicate with the AIM through the COMS via multiple dialogs, each representing a logically distinct sequence of related messages. The messages within each dialog occur in pairs, with each pair comprising an AIM Command from an application requesting the NAP to perform a function and a response from the AIM to the application with appropriate status information or data, such as keyed-in caller digits or message number identification tokens.

The AIM is the point of communication between the NAP and the application(s) and directs the functionality of the NAP. Under the direction of the AIM, the VMMM controls sending and receiving digital voice messages between the NAP and the network. The AIM also communicates with the NIUM to receive digits from the network, such as DTMF digits; to receive status signals from the network; and to control call switching at the interface between the NAP and the network.

The NAP interfaces with the network through one or more NIUs. Each NIU comprises a computer-controlled, digital matrix switch that communicates with the lines and trunks of the network. The NIUs communicate with the voice message portion of the NAP via ports over a communication link comprising a conventional T1 or E1 digital voice link or trunk.

Predetermined voice messages, such as service offering prompts and instructions to callers, are stored on disk. These messages are accessed by the applications via the VMMM and transmitted over a voice channel through selected ports in the NIU or TSP. Voice messages from callers are stored on disk for re-transmission to the network under control of appropriate applications. The NIUM selects and connects the ports of the NIU or TSP under command of the applications and the VMMM controls the flow of the digital voice messages.

Central Office (CO) switches include the capability of detecting a predetermined number of ring-back or busy tones with respect to an incoming call and switching the incoming line to an outgoing line predetermined by the telephone company. Thus, for applications such as Call Answer, the CO can switch the call to a telephone number in the address space of the CO, for routing the call to the NAP so that the appropriate application can provide the service. Other services such as voice-mail and voice-store and forward use appropriate access telephone numbers in the address space of the CO to connect to the desired service. Based on configurable translation of information, such as the incoming port address and telephone number or other information transmitted to the NAP by the CO, the NIUM determines the appropriate application to utilize.

With the above summary description of the NAP as background, we will now describe in greater detail an exemplary implementation of the Inter-System Call Transfer process and system.

Exemplary Inter-System Call Transfer System

Figure 3:
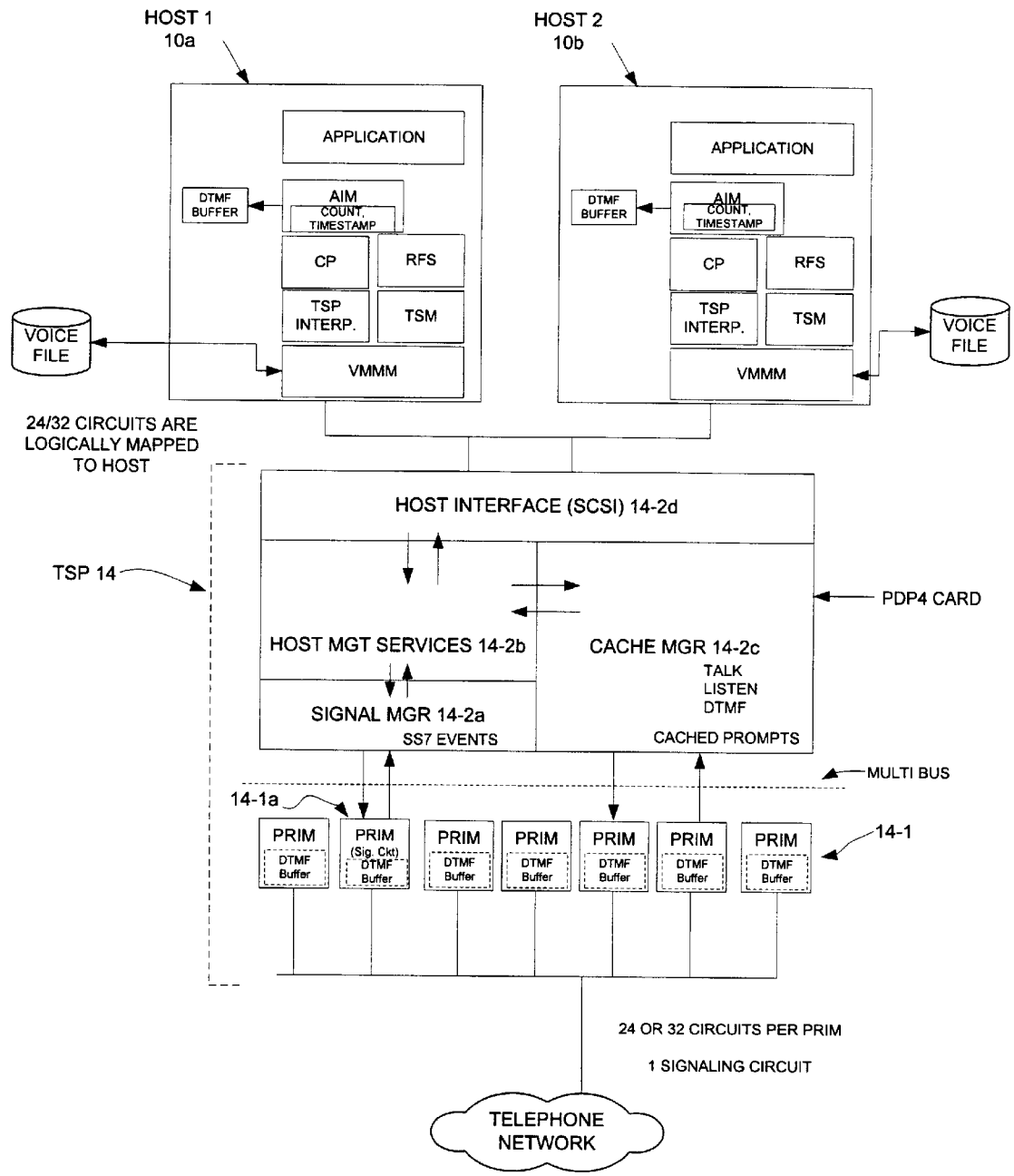
FIG. 3 depicts another view of the shared TSP implementation of FIG. 2.

As shown in FIG. 3, each TSP 14 comprises one or more Primary Rate Interface Modules (PRIMs) 14-1 and a PDP4 Card 14-2. Each PRIM 14-1 interfaces a set of (e.g., 24 or 32) telephone circuits to the PDP4 card 14-2. In addition, one PRIM 14-1a is dedicated to signaling, and communicates with the PDP4 Card's Signaling Manager 14-2a, which in turn communicates with a Host Management Services (HMS) module 14-2b. The HMS module 14-2b communicates with a Cache Manager 14-2c and a Host Interface module 14-2d. The overall function of the TSP 14 is to logically map a plurality of telephone circuits (e.g., 24 or 32 telephone circuits per PRIM) among the respective hosts. The processes performed by the PRIM(s) 14-1, Signaling Manager module 14-2a, Host Management Services module 14-2b, Cache Manager module 14-2c and Host Interface module 14-2d are explained below. Briefly, however, it should be noted that an SS7 packet received at a PRIM is routed to the Signaling Manager 14-2a, which is the SS7 User Part (SS7 level 4). The Signaling Manager converts the SS7 packet to a proprietary message that is ultimately received by a host. Before sending the message to a host, the HMS module 14-2b selects the appropriate host.

The components of the TSP 14 employed in the presently preferred embodiment of the invention may be summarized as follows:

PRIM (Primary Rate Interface module) 14-1: The TSP PRIM module is used to send voice or receive voice from the network upon direction from the VNMS VMMM module (described below). It also is used to create hairpins (i.e., a connection of two voice ports to each other) upon direction from the VNMS TSP Interp Module.

Signaling Manager 14-2a: The Signaling Manager is used to communicate to the network using a country specific protocol such as SS7 or ISDN. It also communicates to the VNMS TSM module for circuit maintenance and the VNMS TSP Interp module for call control.

HMS (Host Management Services module) 14-2b: The TSP HMS module is used to centralize the TSP's handling of the shared TSP functionality. It insulates the rest of the TSP from the mechanics of switching calls from one host to another. It communicates to the VNMS TSP Interp module to transfer calls and the VNMS TSM module to configure the shared TSP environment. All TSP message traffic is routed through the HMS module.

CM (Cache Manager) 14-2c: The TSP CM module is used to provide a high speed buffering of commonly used voice messages to reduce demand on the VNMS VMMM module.

HIP (Host Interface Processor) 14-2d: The HIP board is used to communicate to the host operating system using a SCSI bus to transfer and receive buffers of data between the VNMS and TSP. It enforces the protocol on the TSP to collect messages in an efficient manner to transmit to the host and similarly breaks apart buffers from the host into messages that can be processed by other TSP modules.

In this exemplary embodiment of the system, the host computers 10a and 10b each include the following modules (not all of which are shown in FIG. 3):

VNMS (Voice Network Management System (VNMS)): The Clearpath host-based software that routes incoming calls to the appropriate applications, routes outgoing calls to the appropriate ports, manages the recording and transmission of voice message, and tracks information about each call. A partial set of the VNMS modules include the Application Interface Module (AIM), the Voice Message Management Module (VMMM), the TSP Signaling Manager (TSM), the Remote Files System (RFS), and the TSP Interpreter (TSP Interp).

VMMM (Voice Message Management Module for TSP): The VNMS VMMM module handles the telephony media data, such as voice prompts, voice messages, fax messages and Speech Recognition vocabularies that are passed back and forth between VNMS and the TSP. The media data is stored in a file on disk. This file, called the voicefile, is simply a disk file used for media data. Pointers to the media data are maintained in a database called the Voice Input/Output database (VIODB). All activities performed by VMMM are directed by the VNMS AIM module according to the commands sent by network applications. The TSP CM module caches frequently used media message segments; VMMM does not have to pass media data to the TSP for every application send message command. The VMMM also communicates to the host operating system using a SCSI bus to send and receive buffers of messages to and from the TSP HIP module.

TSP Interp (TSP Interpreter): The VNMS TSP Interp module interprets signaling and event TSP messages using VNMS control and data structures. TSP signaling messages include the initiation, transfer and termination of calls. TSP event operations include incoming DTMF digit messages, purging and retrieving DTMF. TSP Interp uses a data structure called the call record to keep the attributes of a call. It will communicate to the VNMS CP module to handle application responses or requests. It will communicate to the VNMS VMMM module as appropriate to communicate to the TSP.

CP (Call Processing Module): The VNMS CP module provides the interface for call processing configuration. It receives requests from the TSP Interp or AIM module and sends requests to the TSP Interp or AIM module. The CP module uses the call record data structure and NDMDB database to decide how to permute digit fields, define application call types and other administrator defined functions.

NDMDB (Network Data Model Database): The VNMS NDMDB contains the administration defined configuration. During initialization the NDMDB is loaded into a set of memory data structures called turbo arrays. The turbo arrays are used to retrieve information during call processing.

TSM (TSP Signaling Manager): The VNMS TSM module is used to accept all messages from the TSP that are not telephony media related. TSM distributes all signaling and event messages to the TSP Interp, all remote file system commands to the RFS module and processes all circuit maintenance operations itself. Circuit maintenance operations handle the suspending and resuming network circuits.

AIM (Application Interface Module): The VNMS AIM module translates high level application commands from each application to functions specific to each of the other modules in NAP such as VMMM and CP. It also translates VNMS function calls from the lower layers of VNMS to application responses. AIM interfaces with one or more network applications (NAs) through standard host interfaces. For example, the Send Message command plays a message, optionally records a message, and collects DTMF digits. AIM reports results of command execution back to the application by way of response. These commands and responses carry with them unique dialog Ids, assigned by AIM, that associate them with a call.

RFS (VNMS Remote File System): The VNMS RFS module is a service module for the TSP and acts as a file server for TSP data, such as tracing and configuration definitions. The RFS module is required during TSP initialization for the TSP to obtain all its code and initial data value.

In the exemplary embodiment, there are three situations in which the Inter-System Call Transfer feature of the present invention may be employed:

1. Emergency Conditions. An application on a host to which a call was originally routed may not be initialized or may not be responding. The call can be transferred to another application on a different host.

2. Configuration. Routing tables can be created that specify which host can accept certain types of calls. For example, certain phone numbers might be assigned to different hosts for processing.

3. Application Control. An application running on one host can decide whether or not it is the correct application to handle an incoming call, and if not, the application can request that the call be transferred to a different application on another host.

Each TSP is connected to certain "ports" of the telephone network. A call coming into a given port is received by the TSP connected to that port. Specifically, a call comes into a PRIM board in the TSP, and a Signaling Manager on a PDP4 board routes the call to a Host Management Services (HMS) module on the PDP4 board in the TSP (see FIG. 3). The call comes in on a reserved signaling channel of the PRIM and is immediately transferred to the Signaling Manager on the PDP4 board. The signaling manager reformats the call packet and gives it to the HMS module, which in turn gives it to the Host Interface Module. The Host Interface Module places the call on the SCSI bus. The VNMS VMMM module takes the call from the SCSI bus and submits it to the TSP Interp module (via the TSM), which creates the call record. The TSP Interp module gives the call to the CP module that sits between the AIM and TSP Interp, which interrogates the database information in memory, to obtain the necessary information (via digit fields supplied from the network) to route the call to the proper application. The CP module then queues the call to the application interface module (AIM). The AIM dequeues the call and gives it to the specified application.

Each new incoming call is assigned a TSP identifier, a PRIM identifier, and a channel identifier. The HMS module 14-2b uses a routing algorithm to route the new call to one of the hosts. For example, a simple round-robin algorithm may be used. If a subsequent call comes in with the same TSP, PRIM, and channel identifiers, it is routed to the host that last processed a call for this same TSP, PRIM, and channel instance. Once the TSP has routed a call to a particular host, it assumes that the host is handling the call.

When the VNMS on a host receives an incoming call from a TSP 14, a determination is made as to whether that host and/or application can process the call. For example, the VNMS may perform call-type mapping to determine if the application running on it is capable of processing the call. If so, it passes the call to the application for handling. The application itself can also determine whether to process a given incoming call. If either the VNMS or the application determines that the call cannot be processed on the host, a request can be issued to the TSP to transfer the call to another host.

The TSP 14 maintains internal tables to keep track of the status of a call, particularly its beginning and end, so that, if a transfer request is received close to the beginning or end of a call, it can process the request correctly. When an application or a host makes a decision to transfer a call, the VNMS on the host creates a Transfer Port message containing information about the state of the call. All attributes from a telephony network point of view and the application point of view are provided. Two of the most important pieces of information in the Transfer Port message are (1) a call record containing information regarding the current host and application state, and (2) information identifying the new host.

The Transfer Port message is transmitted from the host 10 to the TSP 14. The HMS module 14-2b receives the message and routes it to the new host. The VNMS on the new host uses the call record information to recreate the state of the call on the new host. The VNMS then informs the new application that the call is there.

One particularly important aspect of the Inter-System Call Transfer process is the handling of DTMF signals. As DTMF signals come into the TSP 14 from the caller, they are buffered in a local DTMF buffer residing in the PRIM. The TSP 14 then passes these DTMF signals to the host 10. In the host, the DTMF signals are temporarily buffered by the AIM. The AIM then passes the DTMF signals to the application, which processes them accordingly.

An issue that arises with the Inter-System Call Transfer feature of the present invention is how to handle DTMF signals that might come in from a caller as the call is in the process of being transferred to another host at the request of the original application. For example, suppose that the original application has received and responded to three DTMF digits input by a caller, and then a decision is made to transfer the call. The application will not process any more DTMF digits, but the caller may continue to enter them as the transfer request is being processed. There should be some way to preserve those additional DTMF digits, so that the application on the new host can process them. To solve this problem, the AIM keeps a count of the number of DTMF digits that the application has processed, as well as a timestamp for each digit.

The timestamp is used by the AIM to decide if any of the DTMF signals are grouped together as one unit. For instance, the application can specify via a voice command that the inter-digit delay is 0.5 seconds. If two DTMF signals that are members of the "double-click" class (i.e., AA, BB, CC . . . , 00, 11, 22, . . . ) occur within the inter-digit delay, then the AIM will report the double-DTMF as one "double-click" DTMF to the application. The AIM does not use its own internal timestamps because they would take into consideration any delay when routing the DTMF through the VNMS. Therefore, the TSP timestamp is used.

When a transfer request is made, a "Purge DTMF" operation is performed, causing the TSP to stop passing DTMF signals to the AIM and instead to buffer incoming DTMF signals in the local TSP buffer. In addition, the count of the number of DTMF digits that the application has already processed is included in the call record information passed to the TSP 14 in the Transfer Port message. With this information, the TSP can determine which DTMF signals in its buffer have or have not already been processed by the original application. Any DTMF signals/digits that have not yet been processed are then replayed to the new application on the new host. Thus, no DTMF signals are lost in the transfer process.

FIGS. 4A and 4B depict the basic call flows for a single call in which the subscriber speaks to the application on Host A, Host A transfers the call to Host B, Host B speaks to the caller, and then Host B terminates the call. FIG. 4A shows the call flow controlled by an application, and FIG. 4B shows the call flow controlled by configuration or host error.

Call Flow Controlled by Application—FIG. 4A

FIG. 4A shows an example of the basic high level TSP-Host call flow for the transfer of a call from Host n. The individual linkages within the TSP and VNMS are not shown in order to simplify the schematic. The call flow starts off with an incoming call from the network that is translated by the Signaling Manager (not shown) of the TSP into an "Initiate" operation. For simplicity sake, the TSP shown in the diagram is used for both signaling and voice. In the presently preferred configuration, in a normal customer environment the signaling TSP would be different from the voice TSP.

The TSP issues an "Initiate" operation to VNMSn (i.e., the VNMS for Host n). VNMSn then issues an "Incoming Call" operation to Appl (host n) (i.e., the Application on Host n).

Appl (host n) then issues a "Connect Call" operation to VNMSn, which in turn issues an "Allow Group" operation to the voice TSP (which is the same as the signaling TSP in the diagram).

VNMSn then issues an "Answer" operation to the TSP. The TSP signaling manager will translate the Answer into an SS7 response that is understood by the network.

The network responds to the TSP and it translates the response into an "Answer" operation to VNMSn, which in turn issues a "Call Connected" operation to Appl (host n). The network assumes the call is now controlled by the NAP.

Next, Appl (host n) issues an "Extended Send Voice" operation to VNMSn, which in turn issues a "Send Group" operation to the TSP. The application has now established communication with the caller.

It is likely that the caller will enter DTMF which is sent by the TSP via DTMF operations to VNMSn.

Concurrently, the TSP detects the end of the voice communication and sends a "Group Result" operation to VNMSn, which in turn sends a "Message Sent" operation to Appl (host n).

The Appl (host n) determines that the subscriber data resides on a different host and issues a "Transfer Dialog" operation to VNMSn, which in turn sends a "Purge DTMF (Count)" operation to the TSP.

VNMSn captures all relevant information from the "Transfer Dialog," inserts it into the "Transfer Port" operation and sends the "Transfer Port" operation to the TSP. At this point, some DTMF signals sent by the TSP may be ignored on Host n since the call has been transferred. The count of the DTMF signals/digits received by Host n, sent via the "Purge DTMF (Count)" operation, will be used to replay DTMF, if necessary, to Host n+1.

The TSP then sends a "Transfer Port" operation to VNMSn+1.

VNMSn+1 responds by sending a "Retrieve DTMF" operation to the TSP.

VNMSn+1 then sends an "Incoming Call" operation to Appl (host n+1).

The TSP next sends DTMF signals to VNMSn+1. The DTMF signals may include DTMF digits that are replayed because they were not captured on Host n. The DTMF are queued in the AIM on Host n+1 and given to the application as appropriate.

The Appl (host n+1) sends a "Send Voice" operation to VNMSn+1, which then sends a "Send Group" operation to the TSP.

A communication has now been established between the application on Host n+1 and the subscriber. The subscriber eventually will terminate the call but in the diagram does not hang up the phone. The TSP then sends a "Group Result" operation to VNMSn+1, which in turn sends a "Message Sent" operation to Appl (host n+1).

Next, Appl (host n+1) sends a "Terminate Call" to VNMSn+1, which in turn sends a "Terminate Group" operation to the TSP.

Next, the TSP issues an "Unconditional Terminate" to VNMSn+1. This acknowledges that the voice path has been discontinued.

Finally, VNMSn+1 issues a "Signaling Terminate" operation to the TSP. The Signaling Manager will communicate to the network that the call has been terminated.

Call Flow Controlled by Configuration or Host Error—FIG. 4B

This call flow is much simpler than the application assisted call flow of FIG. 4A because the incoming call is not received by the application on Host n.

The TSP issues an "Initiate" operation to VNMSn.

VNMS either determines that the configuration tables indicate to route the call to another host or the application can not respond for some reason.

VNMSn issues a "Transfer Port" operation to the TSP.

The TSP then issues a "Transfer Port" operation to VNMSn+1, which in turn issues an "Incoming Call" operation to Appl (host n+1). Once the application accepts the call then the call flow is the same as FIG. 4A.

In addition to the foregoing, it should be noted that another use of Inter-System Call Transfer is to clean up voice circuits after a host failure. That is, if a host processing calls on circuits 1, 2, 3 encounters an outage, the circuits remain in use until the user hangs up or the network terminates the call, both forms of call termination being network initiated. Upon receipt of a network initiated terminate for circuits 1, 2, 3, the TSP will request an available host to terminate and clean up the voice circuit. This request to terminate a call by another host is achieved via the Transfer Port message.

Conclusion

In sum, the present invention provides an Inter-System Call Transfer process that enhances system availability, particularly with respect to a telephone-based messaging system in which NIUs or TSPs are shared by multiple host computers. It is understood, however, that the invention is susceptible to various modifications and alternative constructions. It should be understood that there is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of messaging applications, including electronic messaging systems or mail severs. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

We claim:

1. A telephony system, comprising:
   a first host comprising a first telephony application;
   a second host comprising a second telephony application; and
   a network interface device (NID), operatively coupled to the first and second hosts via a bus, for routing calls on a plurality of telephone circuits to the first and second hosts, for processing by one of the first and second applications;
   wherein the NID includes the capability to transfer a call from one host to another host, whereby a call routed to a host that is unable to process the call can be redirected to another host that is able to process the call, thus improving the availability of the telephony system; and
   wherein the incoming call is comprised of DTMF signals, and, as the DTMF signals are received by the selected NID, they are buffered in a local DTMF buffer; and the selected NID then passes the DTMF signals to the first host.

2. A system as recited in claim 1, wherein, in the first host, the DTMF signals are temporarily buffered by an Application Interface Module (AIM), which then passes the DTMF signals to the first application for processing.

3. A system as recited in claim 2, wherein the AIM keeps a count of the number of DTMF digits that the first application has processed, as well as a timestamp for each signal.

4. A system as recited in claim 3, wherein, when a call transfer request is made by the first host, a purge DTMF operation is performed, whereby the selected NID is made to stop passing DTMF signals to the AIM and instead to buffer incoming DTMF signals in a local NID buffer, thus allowing the selected NID to determine which DTMF signals in its buffer have or have not already been processed by the first application.

5. A system as recited in claim 4, wherein any DTMF signals that have not yet been processed at the time the call is transferred are replayed to the second application on the second host, thereby preventing DTMF signals from being lost during the call transfer process.

6. An inter-system call transfer process for use in a multiple-node voice messaging system in which a plurality of network interface devices (NIDs) are shared among a plurality of host computers coupled to the NIDs by at least one bus, wherein the NIDs are responsible for logically mapping a plurality of telephone circuits to a plurality of host computers for processing by applications running on the host computers, the inter-system call transfer process comprising the acts of:
   receiving a new incoming call via a selected one of the NIDs;
   assigning the incoming call a NID identifier;
   transferring the incoming call from the selected NID to the bus;
   receiving the call in a first host;
   creating a call record in the first host;
   providing the call to a first application running on the first host;
   determining whether the first host can process the call;
   if the first host can process the call, passing the call to a first application running on the first host; and
   if the first host cannot process the call, issuing a request to the selected NID to transfer the call to a second host, wherein the selected NID buffers DTMF signals received in connection with the incoming call, and wherein the process includes identifying the number of DTMF signals that have been processed by the first host when the call is transferred to the second host.

7. A system as recited in claim 6, wherein the new incoming call is received via a primary rate interface module (PRIM) having a plurality of channels for receiving incoming calls; and wherein the incoming call is assigned, in addition to a NID identifier, a PRIM identifier and a channel identifier, which are included in the call record.

8. A system as recited in claim 7, wherein, when a decision is made to transfer the new incoming call, a Transfer Port message containing information about the state of the call is created.

9. A system as recited in claim 8, wherein the Transfer Port message includes a call record that contains information regarding the current host and application state, and information identifying the second host to which the call is to be transferred.

10. A system as recited in claim 9, wherein the Transfer Port message is transmitted from the first host to the NID, and the NID receives the message and routes it to the second host.

11. A system as recited in claim 10, wherein the second host uses the call record information to recreate the state of the call on the second host, and then informs a second application running on the second host that the call is there.

12. An inter-system call transfer process for use in a telephony system in which a plurality of network interface devices (NIDs) are shared among a plurality of host computers coupled to the NIDs by at least one bus, wherein the NIDs are responsible for logically mapping a plurality of telephone circuits to a plurality of host computers for processing by applications running on the host computers, the inter-system call transfer process comprising the acts of:

receiving a new incoming call via a selected one of the NIDs;

assigning an NID identifier to the incoming call;

transferring the incoming call from the selected NID to the bus;

receiving the call in a first host;

creating a call record in the first host;

providing the call to a first application running on the first host;

determining whether the first host can process the call;

if the first host can process the call, passing the call to a first application running on the first host;

if the first host cannot process the call, issuing a request to the selected NID to transfer the call to a second host;

wherein the new incoming call is received via a primary rate interface module (PRIM) having a plurality of channels for receiving incoming calls; and wherein the incoming call is assigned, in addition to the NID identifier, a PRIM identifier and a channel identifier, which are included in the call record;

wherein, when a decision is made to transfer the new incoming call, a Transfer Port message containing information about the state of the call is created;

wherein the Transfer Port message includes a call record that contains information regarding the current host and application state, and information identifying the second host to which the call is to be transferred;

wherein the Transfer Port message is transmitted from the first host to the NID, and the NID receives the message and routes it to the second host;

wherein the second host uses the call record information to recreate the state of the call on the second host, and then informs a second application running on the second host that the call is there; and wherein the incoming call is comprised of DTMF signals, and, as the DTMF signals are received by the selected NID, they are buffered in a local DTMF buffer; and the selected NID then passes the DTMF signals to the first host.

13. A system as recited in claim 12, wherein, in the first host, the DTMF signals are temporarily buffered by an Application Interface Module (AIM), which then passes the DTMF signals to the first application for processing.

14. A system as recited in claim 13, wherein the AIM keeps a count of the number of DTMF digits that the first application has processed, as well as a timestamp for each signal.

15. A system as recited in claim 14, wherein, when a call transfer request is made by the first host, a purge DTMF operation is performed, whereby the selected NID is made to stop passing DTMF signals to the AIM and instead to buffer incoming DTMF signals in a local NID buffer, thus allowing the selected NID to determine which DTMF signals in its buffer have or have not already been processed by the first application.

16. A system as recited in claim 15, wherein any DTMF signals that have not yet been processed at the time the call is transferred are replayed to the second application on the second host, thereby preventing DTMF signals from being lost during the call transfer process.

17. A computer readable storage medium comprising executable instructions for instructing a telephony system computer to perform the steps recited in claim 6.

18. A messaging system, comprising a plurality of network interface devices (NIDs) each of which is shared among a plurality of host computers coupled to the NIDs by at least one bus, wherein the NIDs logically map a plurality of telephone circuits to the plurality of host computers for processing by applications running on the host computers, and wherein the NIDs each include a means for buffering DTMF signals associated with an incoming call.

19. A messaging system as recited in claim 18, further comprising, distributed among the NIDs and host computers, inter-system call transfer means including:

means for receiving a new incoming call via a selected one of the NIDs;

means for assigning the incoming call a NID identifier to the incoming call;

means for transferring the incoming call from the selected NID to the bus;

means for receiving the call in a first host;

means for creating a call record in the first host;

means for providing the call to a first application running on the first host;

means for determining whether the first host can process the call;

means for passing the call to a first application running on the first host if the first host can process the call; and means for issuing a request to the selected NID to transfer the call to a second host if the first host cannot process the call.

* * * * *